United States Patent
Takahashi et al.

(10) Patent No.: US 7,880,440 B2
(45) Date of Patent: Feb. 1, 2011

(54) SWITCHING POWER SUPPLY

(75) Inventors: Fumikazu Takahashi, Hitachi (JP);
Akihiko Kanouda, Hitachinaka (JP);
Masahiro Hamaogi, Odawara (JP);
Yoshihide Takahashi, Odawara (JP)

(73) Assignee: Hitachi Computer Peripherals Co., Ltd., Kanagawa (JP)

( * ) Notice: Subject to any disclaimer, the term of this patent is extended or adjusted under 35 U.S.C. 154(b) by 476 days.

(21) Appl. No.: 12/016,219

(22) Filed: Jan. 18, 2008

(65) Prior Publication Data

US 2008/0174276 A1    Jul. 24, 2008

(30) Foreign Application Priority Data

Jan. 19, 2007    (JP)    .............................. 2007-010050

(51) Int. Cl.
     *H02J 7/04*    (2006.01)
     *G05F 1/00*    (2006.01)

(52) U.S. Cl. ...................... 320/139; 320/128; 323/282

(58) Field of Classification Search ................ 320/128, 320/139; 323/282
See application file for complete search history.

(56) References Cited

U.S. PATENT DOCUMENTS 6,456,511 B1 *   9/2002   Wong ...................... 363/21.13
7,102,898 B2 *   9/2006   Brkovic ...................... 363/19
7,705,562 B2 *   4/2010   Takahashi et al. ........... 320/128
2007/0059016 A1 *   3/2007   Sato et al. ...................... 399/88

FOREIGN PATENT DOCUMENTS

JP    06-342314    12/1994
JP    9-261958    10/1997

OTHER PUBLICATIONS

Office Action in JP 2007-010050, dated Feb. 24, 2009 (3 pgs.) in Japanese.

* cited by examiner

*Primary Examiner*—Edward Tso
*Assistant Examiner*—M'Baye Diao
(74) *Attorney, Agent, or Firm*—Antonelli, Terry, Stout & Kraus, LLP.

(57) ABSTRACT

To provide a smaller and more efficient switching power supply, the switching power supply includes: a high frequency transformer; a primary side switching circuit adapted to switch a current flowing through a primary winding of the high frequency transformer to thereby generate predetermined voltages in a secondary winding and an auxiliary winding of the high frequency transformer; a secondary side rectifier adapted to rectify a voltage generated in the secondary winding to supply the rectified voltage to a load; a charging circuit adapted to rectify a current flowing through the auxiliary winding and to switch the rectified current to thereby charge a secondary battery at a constant current; and a switch, provided between the secondary battery and the load, which supplies, when the voltage supplied to the load is interrupted, the voltage of the secondary battery to the load without going through the high frequency transformer.

5 Claims, 5 Drawing Sheets

SWITCHING POWER SUPPLY 10

OFFSET VALUE STORING SECTION 93

| Number | Reference edge type | Phase change edge type | Offset value |
|--------|---------------------|------------------------|--------------|
| 1      | Rising              | Falling                | −6           |
| 2      | Falling             | Falling                | +2           |

930, 931, 932, 933, 934

SWITCHING POWER SUPPLY

BACKGROUND OF THE INVENTION

1. Field of the Invention

The present invention relates to a switching power supply having a backup function.

2. Background Art

In Patent Document 1, there is disclosed a technique in which a tertiary winding 4b is newly provided for a high frequency transformer in a switching power supply, in which a backup power supply including a secondary battery 14, a charging circuit 3c, and a discharging circuit 3d is connected to the tertiary winding 4b, and in which the discharging circuit 3d is operated at the time of power failure to thereby enable the electric power of the secondary battery 14 to be supplied to a load via the tertiary winding 4b and a secondary winding 4c. By using the technique disclosed in Patent Document 1, it is possible to supply the electric power to the load at the time of power failure, so that an externally mounted UPS (Uninterruptible Power Supply) can be made unnecessary. Further, also when the primary side converter is in failure, it is possible to supply the electric power to the load.

Patent Document 1: Japanese Patent Publication (Kokai) No. 9-261958 A (1997)

SUMMARY OF THE INVENTION

However, in the above described technique disclosed in Patent Document 1, at the time of power failure, DC energy stored in the secondary battery needs to be once converted into AC energy and then to be further converted back to DC energy by a rectifying/smoothing circuit on the secondary side. As a result, a large conversion loss is generated. Therefore, the capacity of the secondary battery needs to be designed relatively large in consideration of the amount of the conversion loss, which is a cause to increase the volume of the secondary battery.

The present invention has been made in view of the above described circumstance. An object of the invention is to provide a smaller and more efficient switching power supply.

In order to solve the above described problem, a switching power supply according to the present invention is adapted to charge a secondary battery via an auxiliary winding of a high frequency transformer, and adapted, when a voltage supplied to a load is interrupted, to supply the voltage of the secondary battery to the load, without via the high frequency transformer.

For example, the present invention provides a switching power supply characterized by including: a high frequency transformer having a primary winding, a secondary winding, and an auxiliary winding; a primary side switching circuit connected to the primary winding of the high frequency transformer, and adapted to switch a current flowing through the primary winding to thereby generate predetermined voltages based on an input voltage, in the secondary winding and the auxiliary winding of the high frequency transformer; a secondary side rectifier connected to the secondary winding of the high frequency transformer, and adapted to rectify the voltage generated in the secondary winding to supply the rectified voltage to a load; a charging circuit connected to the auxiliary winding of the high frequency transformer, and adapted to rectify a current flowing through the auxiliary winding and switch the rectified current to thereby charge the secondary battery at a constant current; a switch provided between the secondary battery and the load; and a control circuit adapted, when the voltage supplied to the load is interrupted, to supply the voltage of the secondary battery to the load by turning on the switch.

According to the present invention, it is possible to provide a smaller and more efficient switching power supply.

DETAILED DESCRIPTION OF THE PREFERRED EMBODIMENTS

In the following, embodiments according to the present invention will be described.

Figure 1:
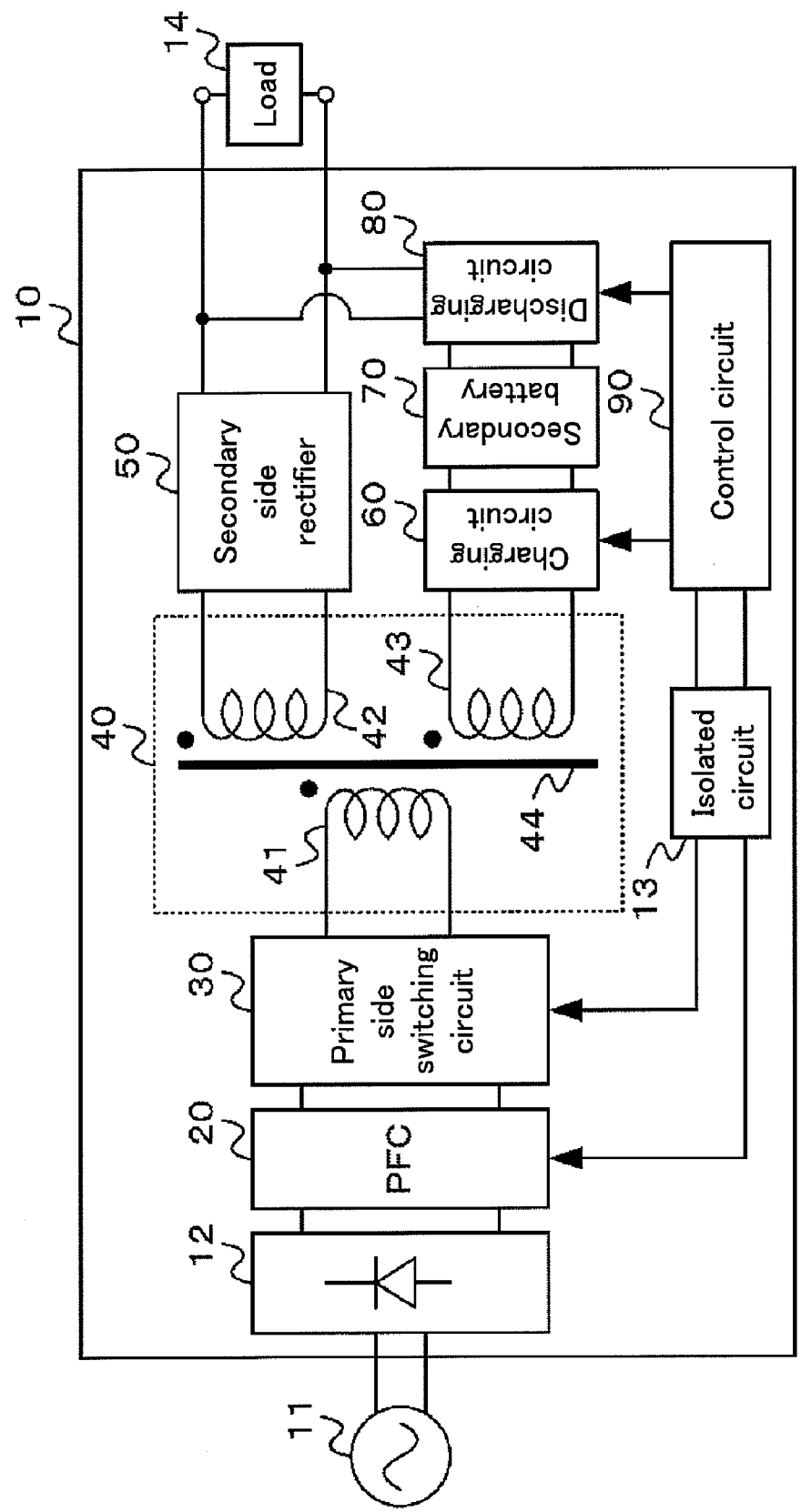
FIG. 1 is a block diagram showing a configuration of a switching power supply 10 according to an embodiment of the present invention.

FIG. 1 is a block diagram showing a configuration of a switching power supply 10 according to an embodiment of the present invention. The switching power supply 10 includes a full-wave rectifier 12, an isolated circuit 13, a PFC (Power Factor Correction) 20, a primary side switching circuit 30, a transformer 40, a secondary side rectifier 50, a charging circuit 60, a secondary battery 70, a discharging circuit 80, and a control circuit 90.

The full-wave rectifier 12 rectifies a voltage and current of a commercial AC power supply 11. The PFC 20 improves the power factor of the rectified voltage and current by switching the current rectified by the full-wave rectifier 12, according to a control signal input from the control circuit 90 via the isolated circuit 13.

The transformer 40 has a primary winding 41, a secondary winding 42, an auxiliary winding 43, and a core 44. The primary side switching circuit 30 supplies to the primary winding 41 the voltage and current whose power factor is improved by the PFC 20, and switches the voltage and current to be supplied to the primary winding 41 according to the control signal input from the control circuit 90 via the isolated circuit 13.

The secondary side rectifier 50 is provided between the secondary winding 42 and a load 14, and rectifies a voltage and current which are generated in the secondary winding 42 by the switching operation of the primary side switching circuit 30, so as to supply the rectified voltage and current to the load 14.

The charging circuit 60 rectifies the voltage and current which are generated in the secondary winding 42 by the switching operation of the primary side switching circuit 30, and charges the secondary battery 70, such as a nickel hydride battery and a lithium ion battery, at a constant current, by switching the rectified voltage and current according to a control signal from the control circuit 90. The discharging circuit 80 supplies the electric power charged in the secondary battery 70 to the load 14, according to a control signal from the control circuit 90.

The control circuit 90 generates control signals respectively supplied to the PFC 20, the primary side switching circuit 30, the charging circuit 60, and the discharging circuit 80 on the basis of the state of the AC power supply 11, the values of voltage and current supplied to the load 14, the values of charging voltage and current of the secondary battery 70, and the like, and supplies the generated control signals to the corresponding blocks. In the present embodiment, the control circuit 90 is, for example, a microcomputer having a microprocessor, a memory, an input/output circuit, and the like.

The control circuit 90 calculates ON and OFF periods of the PFC 20 as needed, on the basis of an average value, a frequency, and the like of the current of the commercial AC power supply 11, and generates a first PWM signal that satisfies the calculated ON and OFF periods. Then, the control circuit 90 supplies the generated first PWM signal as a control signal to the PFC 20 via the isolated circuit 13.

Further, the control circuit 90 monitors the values of voltage and current supplied to the load 14, and calculates ON and OFF periods of the primary side switching circuit 30 as needed, so as to make the voltage and current values kept within predetermined value ranges. Thereby, the control circuit 90 generates a second PWM signal that satisfies the calculated ON and OFF periods. Then, the control circuit 90 supplies the generated second PWM signal as a control signal to the primary side switching circuit 30 via the isolated circuit 13.

Further, when the voltage and current supplied to the load 14 are interrupted, the control circuit 90 supplies the control signal indicating an ON signal to the discharging circuit 80, and backs up the load 14 by making the discharging circuit 80 supply the electric power charged in the secondary battery 70 to the load 14.

Further, the control circuit 90 monitors charging voltage and current values of the secondary battery 70, and calculates ON and OFF periods of the charging circuit 60 as needed, so as to make the charging voltage and current values kept within predetermined value ranges. Thereby, the control circuit 90 generates a third PWM signal that satisfies the calculated ON and OFF periods. Then, the control circuit 90 supplies the generated third PWM signal as a control signal to the charging circuit 60.

The isolated circuit 13, which is for example a photo coupler, an isolation amplifier or the like, supplies the first and second PWM signals generated by the control circuit 90, to the PFC 20 and the primary side switching circuit 30, respectively, and isolates the control circuit 90 from the PFC 20 and the primary side switching circuit 30.

When the voltage and current supplied to the load 14 are interrupted, the switching power supply 10 according to the present embodiment turns on the discharging circuit 80, so as to supply the electric power charged in the secondary battery 70 to the load 14. This makes it possible to reduce the power losses, such as the conversion loss, as compared with case where the electric power charged in the secondary battery 70 is switched again and supplied to the load 14 via the transformer 40 and the secondary side rectifier 50.

As a result, it is possible to suppress the increase in the capacity of the secondary battery 70 and the increase in the volume of the switching power supply 10. Further, it is possible to lower the withstand voltage of peripheral circuit elements of the secondary battery 70, so that the miniaturization and cost reduction of components can be realized.

Conventionally, it is also common to respectively provide, on the primary and secondary sides of the transformer 40, control circuits such as a microcomputer, which asynchronously control converters for respectively driving the primary and secondary sides on the basis of the PWM signals. On the other hand, in the present embodiment, one control circuit 90 is provided on the secondary side of the transformer 40. This enables the number of components to be reduced, and enables the synchronous control based on the plurality of PWM signals to be easily realized.

Further, in the present embodiment, the control circuit 90 is provided on the secondary side of the transformer 40. Thereby, a control line which transmits a control signal from the load 14 can be connected to the control circuit 90 without via the isolated circuit 13, and hence the control circuit 90 is capable of promptly responding to a request from the load 14 without the influence of the delay in transmission via the isolated circuit 13.

Figure 2:
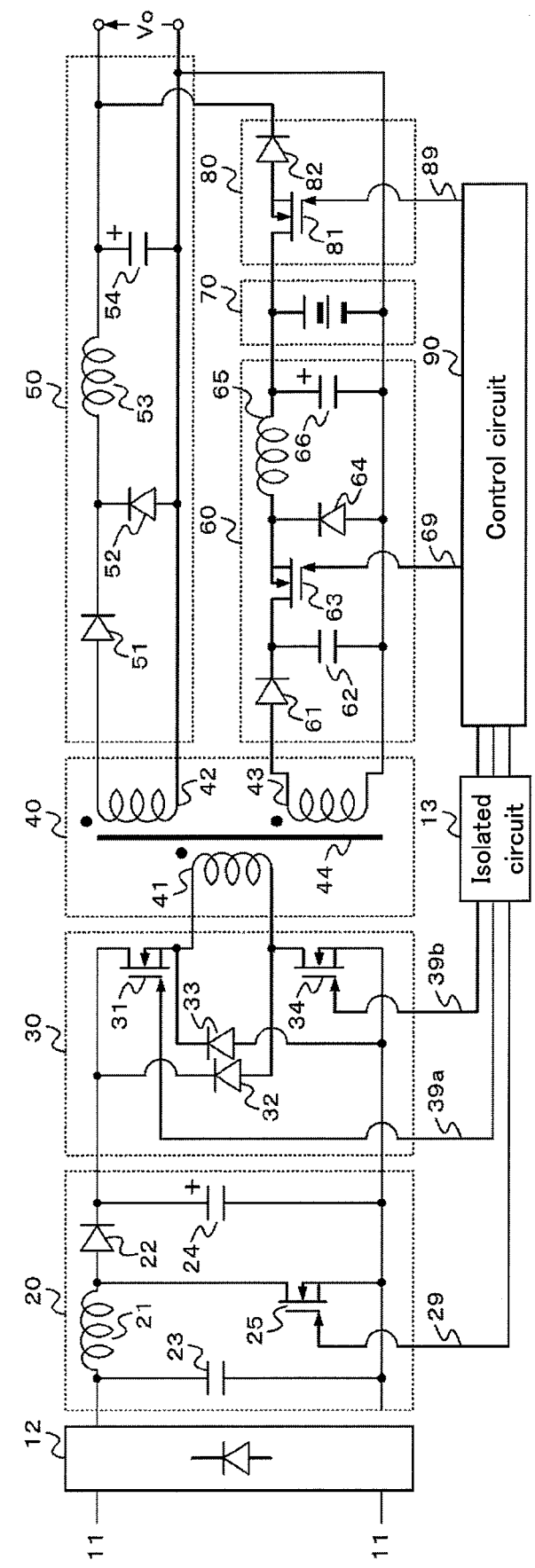
FIG. 2 is a block diagram showing an example of a detailed configuration of the switching power supply 10.

Next, there will be further described the details of the switching power supply 10 with reference to FIG. 2. FIG. 2 is a block diagram showing an example of a detailed configuration of the switching power supply 10.

The PFC 20 has a choke coil 21, a free-wheel diode 22, a capacitor 23, a smoothing capacitor 24, and a main switch 25. The main switch 25 is switched according to a first PWM signal 29 from the control circuit 90, so that the PFC 20 improves the power factor of a voltage and current rectified by the full-wave rectifier 12, and supplies to the primary side switching circuit 30 the voltage and current whose power factor is improved.

The primary side switching circuit 30 has a main switch 31, a reset diode 32, a reset diode 33, and a main switch 34. The main switch 31 and the main switch 34 are respectively switched according to second PWM signals 39a and 39b from the control circuit 90, so that the primary side switching circuit 30 generates electric power in the secondary winding 42 and the auxiliary winding 43 via the primary winding 41 and the core 44. The second PWM signals 39a and 39b are almost simultaneously turned on and off the main switch 31 and the main switch 34.

Here, it is possible to reduce the capacitance of the smoothing capacitor 24 by controlling the main switch 25, the main switch 31, and the main switch 34 in such a manner that the main switch 31 and the main switch 34 of the primary side switching circuit 30 are turned off during a period in which the main switch 25 of the PFC 20 is turned on, and that the main switch 31 and the main switch 34 of the primary side switching circuit 30 are turned on during a period in which the main switch 25 of the PFC 20 is turned off. To this end, the control circuit 90 generates the first PWM signal 29, the second PWM signal 39a, and the second PWM signal 39b, which enable the main switch 25, the main switch 31, and the main switch 34 to be controlled in the above described manner, and supplies the generated signals to the main switches, respectively.

The secondary side rectifier 50 has a rectifying diode 51, a free-wheel diode 52, a choke coil 53, and a smoothing capacitor 54, and rectifies the voltage and current generated in the secondary winding 42 by the switching of the main switch 31 and the main switch 34, so as to supply the rectified voltage and current to the load 14. In the present embodiment, the primary side switching circuit 30, the transformer 40, and the secondary side rectifier 50 form a double forward converter.

The charging circuit 60 has a rectifying diode 61, a capacitor 62, a main switch 63, a free-wheel diode 64, a choke coil 65, and a smoothing capacitor 66. The rectifying diode 61 and the capacitor 62 rectify the voltage and current which are generated in the auxiliary winding 43 by the switching of the main switch 31 and the main switch 34.

The main switch 63 maintains the voltage and current supplied to the secondary battery 70 via the free-wheel diode 64, the choke coil 65, and the smoothing capacitor 66 at a predetermined value, by switching the voltage and current which are rectified by the rectifying diode 61 and the capacitor 62, according to a third PWM signal 69 from the control circuit 90. In the present embodiment, the charging circuit 60 constitutes a step-down converter.

Here, it is possible to reduce the capacitance of the capacitor 62, by controlling the main switch 31, the main switch 34, and the main switch 63 in such a manner that the main switch 63 of the charging circuit 60 is turned on during the period in which the main switch 31 and the main switch 34 of the primary side switching circuit 30 are turned on, and that the main switch 63 of the charging circuit 60 is turned off during the period in which the main switch 31 and the main switch 34 of the primary side switching circuit 30 are turned off. To this end, the control circuit 90 generates the second PWM signal 39a, the second PWM signal 39b, and the third PWM signal 69, which enable the main switch 31, the main switch 34, and the main switch 63 to be controlled in the above described manner, and supplies the generated signals to the main switches, respectively.

The discharging circuit 80 has a main switch 81 and a reverse current preventing diode 82. The main switch 81 supplies the electric power charged in the secondary battery 70 to the load 14 via the reverse current preventing diode 82, according to a switching signal 89 from the control circuit 90, which signal instructs control to turn on the main switch 81.

In the present embodiment, the switching power supply 10 supplies the DC power charged in the secondary battery 70 to the load 14 in the DC state as it is via the discharging circuit 80, without via the transformer 40. This enables the discharging circuit 80 to be constituted by a simple circuit having a relatively small number of components including transistors and diodes. Because of the small number of components, it is possible to lower the possibility that the discharging circuit 80 fails, to thereby improve the reliability of the discharging circuit 80.

Figure 3:
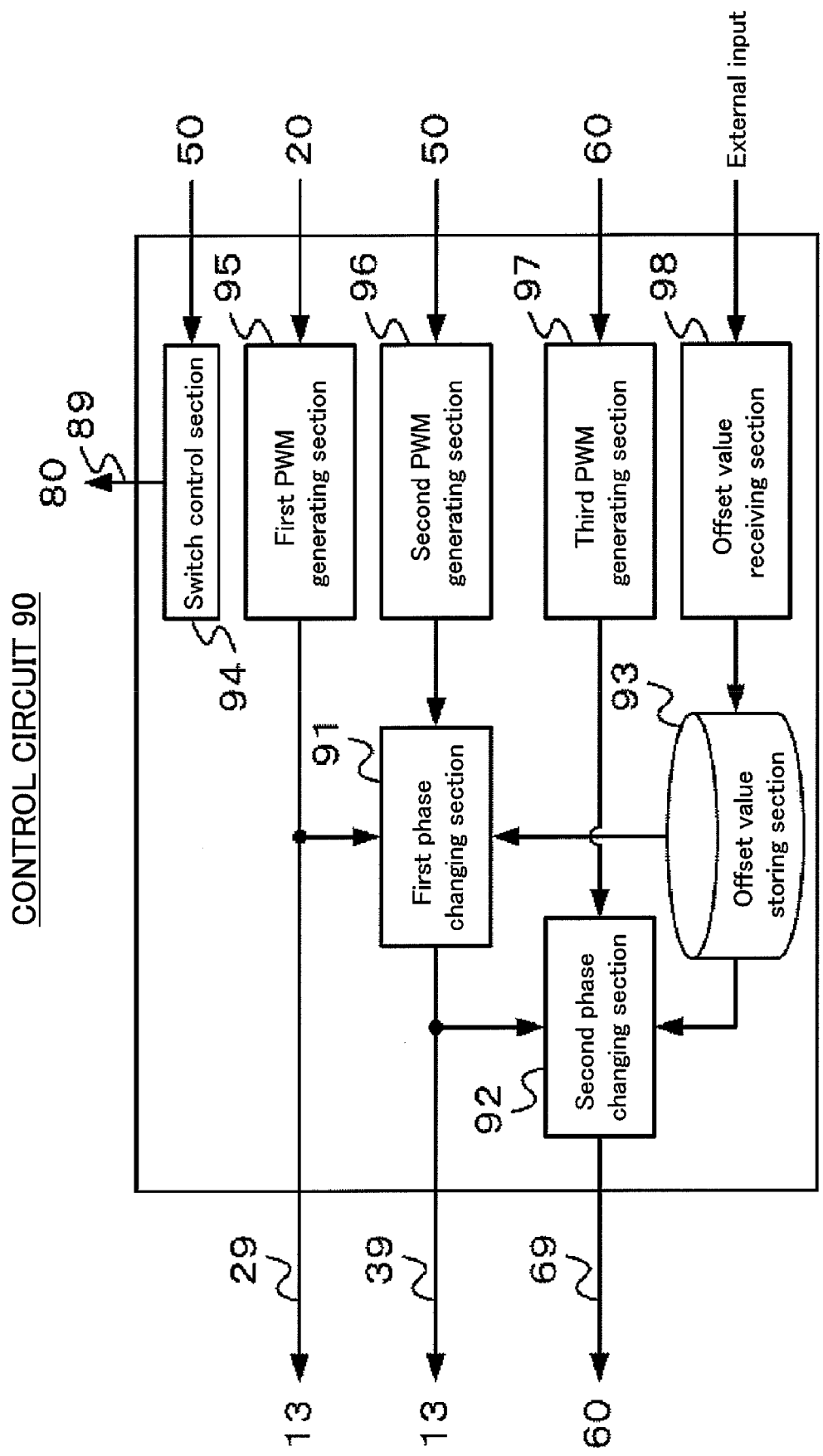
FIG. 3 is a block diagram showing an example of a detailed functional configuration of a control circuit 90.

Next, a detailed functional configuration of the control circuit 90 will be described. FIG. 3 is a block diagram showing an example of the detailed functional configuration of the control circuit 90. The control circuit 90 has a first phase changing section 91, a second phase changing section 92, an offset value storing section 93, a switch control section 94, a first PWM generating section 95, a second PWM generating section 96, a third PWM generating section 97, and an offset value receiving section 98.

The switch control section 94 monitors the voltage and current supplied from the secondary side rectifier 50 to the load 14. When the voltage and current supplied to the load 14 are interrupted, the switch control section 94 generates the switching signal 89 instructing to turn on the discharging circuit 80, and supplies the generated signal to the discharging circuit 80.

The first PWM generating section 95 monitors an average value, a frequency, and the like of the current of the commercial AC power supply 11, and calculates the ON and OFF periods of the PFC 20 as needed. The first PWM generating section 95 generates the first PWM signal that satisfies the calculated ON and OFF periods, and supplies the first PWM signal to the isolated circuit 13 and the first phase changing section 91.

The second PWM generating section 96 monitors the values of voltage and current supplied to the load 14, and calculates the ON and OFF periods of the primary side switching circuit 30 as needed, so as to make the voltage and current values kept within predetermined value ranges. Then, the second PWM generating section 96 generates the second PWM signal that satisfies the calculated ON and OFF periods, and supplies the generated second PWM signal to the first phase changing section 91.

The third PWM generating section 97 monitors the values of charging voltage and current of the secondary battery 70, and calculates the ON and OFF periods of the charging circuit 60 as needed, so as to make the charging voltage and current values kept within predetermined value ranges. Then, the third PWM generating section 97 generates the third PWM signal that satisfies the calculated ON and OFF periods, and supplies the generated third PWM signal to the second phase changing section 92. The first PWM generating section 95, the second PWM generating section 96, and the third PWM generating section 97 generate the PWM signals having the same period.

Figures 4, 5:
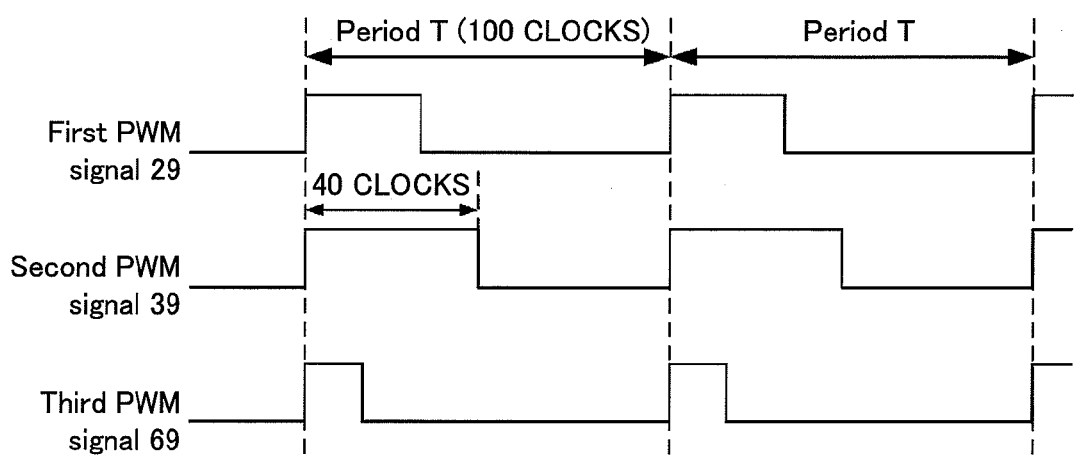
FIG. 4 is a figure showing an example of a data structure stored in an offset value storing section 93.
FIG. 5 is a conceptual diagram showing an example of a phase relation between a first PWM signal 29, a second PWM signal 39, and a third PWM signal 69 before the phase change.

In the offset value storing section 93, as shown for example in FIG. 4, two records 934 are stored so as to correspond to numbers 930 for identifying the respective records 934. In each of the records 934, there are stored a reference edge type 931 indicating the type of the rising edge or the falling edge of a PWM signal serving as a reference, a phase change edge type 932 indicating the type of the rising edge and the falling edge of a PWM signal whose phase is to be changed, and an offset value 933 indicating the change amount of the phase.

In the first record 934, the reference edge type 931 indicates the reference edge type of the first PWM signal, and the phase change edge type 932 indicates the phase change edge type of the second PWM signal. In the second record 934, the reference edge type 931 indicates the reference edge type of the second PWM signal, and the phase change edge type 932 indicates the phase change edge type of the third PWM signal. The first record 934 is referred to by the first phase changing section 91, and the second record 934 is referred to by the second phase changing section 92.

In the present embodiment, in the offset value 933, for example, the number of clocks corresponding to the time period of the phase change is specified together with a sign, in a clock unit which indicates the resolution of the PWM signal generated by the control circuit 90. For example, in the case where the PWM signal is operated at a clock having a resolution of 1 MHz, "+2" indicates that the edge of the PWM signal, at which edge the phase is to be changed, is delayed by 2 µs (two clocks) from the reference edge of the PWM signal. On the other hand, "−6" indicates that the edge of the PWM signal, at which edge the phase is to be changed, is generated by 6 µs (six clocks) before the reference edge of the PWM signal.

The offset value receiving section 98 is an interface for enabling the reference edge type 931, the phase change edge type 932, and the offset value 933, which are input from the outside of the control circuit 90, to be stored in the offset value storing section 93 in correspondence with the specified number 930.

The first phase changing section 91 refers to the first record 934 stored in the offset value storing section 93, and acquires the reference edge type 931, the phase change edge type 932, and the offset value 933 which are stored in the record 934. Then, the first phase changing section 91 delays the edge of the second PWM signal which edge is specified in the phase change edge type 932, by the time specified in the offset value 933, on the basis of the edge of the first PWM signal which edge is specified in the reference edge type 931, and outputs the delayed second PWM signal to the isolated circuit 13 and the second phase changing section 92.

Figure 6:
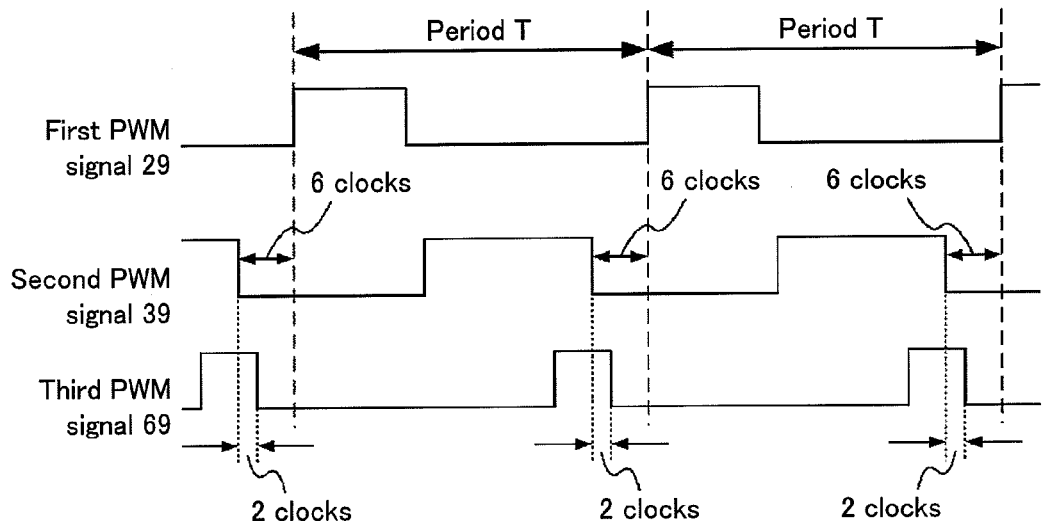
FIG. 6 is a conceptual diagram showing an example of a phase relation between the first PWM signal 29, the second PWM signal 39, and the third PWM signal 69 after the phase change.

The process of processing which is performed by the first phase changing section 91 will be described in detail with reference to FIG. 5 and FIG. 6. FIG. 5 shows a phase relation between the first PWM signal 29, the second PWM signal 39, and the third PWM signal 69 before the phase change. FIG. 6 shows a phase relation between the first PWM signal 29, the second PWM signal 39, and the third PWM signal 69 after the phase is changed by the first phase changing section 91 and the second phase changing section 92.

Note that FIG. 5 shows, for reasons of clarity, an example in which the phases of the respective PWM signals before the phase change are aligned. However, the phases of the respective PWM signals before the phase change may not necessarily be aligned.

First, the first phase changing section 91 refers to the first record 934 stored in the offset value storing section 93 to acquire the reference edge type 931, the phase change edge type 932, and the offset value 933. Then, the first phase changing section 91 calculates a phase difference between the edge of the first PWM signal supplied from the first PWM generating section 95, which edge is specified in the reference edge type 931, and the edge of the second PWM signal, which edge is specified in the phase change edge type 932.

FIG. 5 shows an example in which the phase difference between the reference rising edge of the first PWM signal 29 and the falling edge of the second PWM signal 39, which is nearest to the reference rising edge, is 40 clocks. Note that in FIG. 5 and FIG. 6, there is shown an example in which the period T of the respective PWM signals is set to 100 clocks (100 μs).

Next, the first phase changing section 91 determines whether or not the calculated phase difference is within a range predetermined by using the offset value 933 as the center (for example, within ±1 clock). When the calculated phase difference is not within the predetermined range, the first phase changing section 91 calculates the delay amount of the second PWM signal 39 that satisfies the offset value 933.

In the example shown in FIG. 5 and FIG. 6, the first phase changing section 91 calculates a value as the delay amount, by subtracting the calculated phase difference (40 clocks in the present example) and further the offset value (6 clocks in the present example) from the period T of the PWM signal (100 clocks in the present example). In the example shown in FIG. 6, the value of 54 clocks is calculated as the delay amount.

Next, the first phase changing section 91 delays the second PWM signal 39 by the calculated delay amount, and outputs the delayed second PWM signal 39 to the isolated circuit 13 and the second phase changing section 92.

The second phase changing section 92 refers to the second record 934 stored in the offset value storing section 93, and acquires the reference edge type 931, the phase change edge type 932, and the offset value 933, which are stored in the record 934.

Then, the second phase changing section 92 calculates the phase difference between the edge of the second PWM signal whose phase is controlled by the first phase changing section 91, which edge is specified in the reference edge type 931, and the edge of the third PWM signal, which edge is specified in the phase change edge type 932.

Then, the second phase changing section 92 determines whether or not the calculated phase difference is within a range predetermined by using the offset value 933 as the center (for example, within ±1 clock). When the calculated phase difference is not within the predetermined range, the second phase changing section 92 calculates the delay amount of the second PWM signal 39 that satisfies the offset value 933, and delays the third PWM signal 69 by the calculated delay amount, to output the delayed third PWM signal 69 to the charging circuit 60. As a result, the phase relation between the second PWM signal 39 and the third PWM signal 69 is obtained, for example, as shown in FIG. 6.

Note that the first phase changing section 91 and the second phase changing section 92 check whether or not the phase difference between the PWM signals to be compared is within the range predetermined by using the offset value in the offset value storing section 93 as the center, at every predetermined time interval (for example, for every ten periods of the PWM signal).

Here, it is possible to reduce the ripple in the voltage and current output from the PFC 20 by performing the control in which the primary switch 31 and the primary switch 34 of the primary side switching circuit 30 are turned off at a predetermined time period before the main switch 25 of the PFC 20 is turned on, or in which the primary switch 31 and the primary switch 34 of the primary side switching circuit 30 are turned on after the lapse of a predetermined time period after the main switch 25 of the PFC 20 is turned off.

Further, a high surge voltage may be generated in the rectifying diode 61 when the main switch 63 of the charging circuit 60 is turned off at the timing when the main switch 31 and the main switch 34 of the primary side switching circuit 30 are turned off. Thus, it is controlled such that the main switch 63 of the charging circuit 60 is turned off after the lapse of a predetermined period of time after the main switch 31 and the main switch 34 of the primary side switching circuit 30 are turned off. Thereby, the surge voltage generated in the rectifying diode 61 can be suppressed to a low level, so as to enable a diode with low withstand voltage to be used as the rectifying diode 61. As a result, it is possible to realize the cost reduction and miniaturization of the switching power supply 10.

In the present embodiment, optimum offset values obtained by an experiment or the like are set in the offset value storing section 93. This enables the first phase changing section 91 and the second phase changing section 92 to maintain the edge timing of the plurality of PWM signals within the predetermined optimum time differences by referring to the offset value storing section 93. Therefore, it is possible to provide a switching power supply 10 with higher performance.

In the above, the embodiment according to the present invention was described.

As is apparent from the above description, according to the present invention, it is possible to provide a smaller and more efficient switching power supply 10.

Note that the present invention is not limited to the above described embodiment, and a variety of modifications may be made within the scope and spirit of the present invention.

Figure 7:
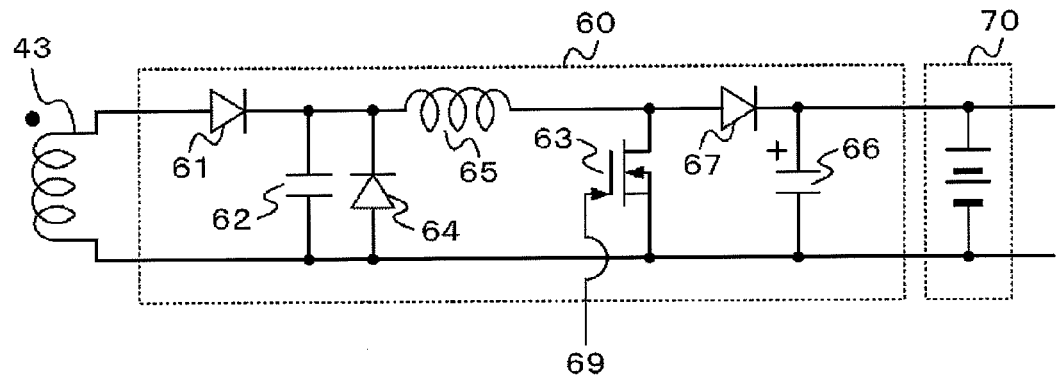
FIG. 7 is a circuit diagram showing another example of a configuration of a charging circuit 60.

For example, in the above described embodiment, the charging circuit 60 constitutes a step-down converter. However, for example, as shown in FIG. 7, the charging circuit 60 may further include a rectifying diode 67, so as to constitute a step-up converter. This enables the charging circuit 60 to charge the secondary battery 70 at a voltage higher than the voltage generated in the auxiliary winding 43.

Figure 8:
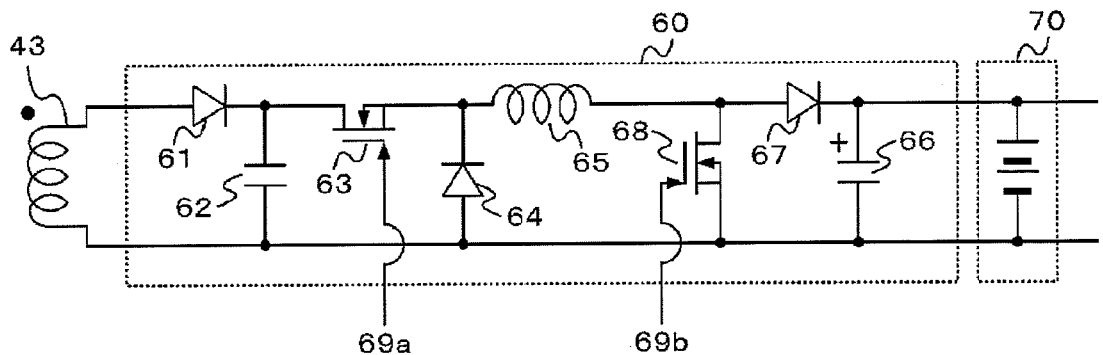
FIG. 8 is a circuit diagram showing another example of a configuration of the charging circuit 60.

Further, as shown in FIG. 8, it may also be configured such that the charging circuit 60 further includes the rectifying diode 67 and a main switch 68, to be operated as any of the step-down and the step-up converter. In FIG. 8, when the charging circuit 60 is operated as the step-down converter, a Low voltage is supplied to a third PWM signal 69*b*, and the third PWM signal is supplied to a third PWM signal 69a according to values of the charging voltage and current of the secondary battery 70.

Further, when the charging circuit 60 is operated as the step-up converter, a High voltage is supplied to the third PWM signal 69a, and the third PWM signal is supplied to the third PWM signal 69b according to the values of charging voltage and current of the secondary battery 70. This enables the charging circuit 60 to cope with either a secondary battery 70 having a voltage higher than the voltage generated in the auxiliary winding 43 or a secondary battery 70 having a voltage lower than the voltage generated in the auxiliary winding 43.

Further, in the above described embodiment, the switching power supply 10 includes therein the secondary battery 70. However, as another embodiment, it may also be configured such that the secondary battery 70 is provided separately from the switching power supply 10, and that the switching power supply 10 charges the external secondary battery 70, and enables, when the voltage and current supplied to the load 14 are interrupted, the electric power of the external secondary battery 70 to be supplied to the load 14 via the discharging circuit 80.

What is claimed is:

1. The switching power supply comprising:
a high frequency transformer having a primary winding, a secondary winding, and an auxiliary winding;
a primary side switching circuit connected to the primary winding of the high frequency transformer, and adapted to switch a current flowing through the primary winding to thereby generate predetermined voltages based on an input voltage, in the secondary winding and the auxiliary winding of the high frequency transformer;
a secondary side rectifier connected to the secondary winding of the high frequency transformer, and adapted to rectify the voltage generated in the secondary winding to supply the rectified voltage to a load;
a charging circuit connected to the auxiliary winding of the high frequency transformer, and adapted to rectify a current flowing through the auxiliary winding and to switch the rectified current to thereby charge the secondary battery at a constant current;
a switch provided between the secondary battery and the load; and
a control circuit adapted, when the voltage supplied to the load is interrupted, to supply the voltage of the secondary battery to the load by turning on the switch,
wherein the secondary side rectifier, the charging circuit, the secondary battery, and the control circuit have a same reference potential, further comprising:
a power factor improving circuit adapted to remove a high frequency component of an input current by switching the input current and by controlling the switching interval, and adapted to supply the input current to the primary side switching circuit,
wherein the power factor improving circuit, the primary side switching circuit, and the charging circuit, each performs a switching operation on the basis of a PWM signal input as a control signal, and
wherein the control circuit generates the PWM signal supplied to each of the power factor improving circuit, the primary side switching circuit, and the charging circuit, and supplies the generated PWM signal to each of the power factor improving circuit and the primary side switching circuit via an isolated circuit.

2. The switching power supply according to claim 1,
wherein the control circuit comprises:
a first PWM generating section adapted to generate a first PWM signal that is the PWM signal supplied to the power factor improving circuit;
a second PWM generating section adapted to generate a second PWM signal that is the PWM signal supplied to the primary side switching circuit;
a third PWM generating section adapted to generate a third PWM signal that is the PWM signal supplied to the charging circuit;
an offset value storing section adapted to store a first offset value that is an offset value of the second PWM signal and is based on the first PWM signal, and a second offset value that is an offset value of the third PWM signal and is based on the second PWM signal;
a first phase changing section adapted to offset the phase of the second PWM signal from the first PWM signal by referring to the first offset value stored in the offset storing section; and
a second phase changing section adapted to offset the phase of the third PWM signal from the second PWM signal whose phase is changed by the first phase changing section, by referring to the second offset value stored in the offset storing section.

3. The switching power supply according to claim 2,
wherein the first PWM signal, the second PWM signal, and the third PWM signal have a same period.

4. The switching power supply according to claim 3,
wherein the first offset value is made to correspond to a reference edge type indicating a rising edge or a falling edge of the first PWM signal serving as a reference, and to correspond to a phase change edge type indicating a rising edge and a falling edge of the second PWM signal whose phase is to be changed,
wherein the second offset value is made to correspond to a reference edge type indicating a rising edge or a falling edge of the second PWM signal serving as a reference, and to correspond to a phase change edge type indicating a rising edge or a falling edge of the third PWM signal whose phase is to be changed,
wherein the first phase changing section offsets, according to the first offset value, the edge of the second PWM signal which edge is made to correspond to the first offset value and the phase change edge type, from the edge of the first PWM signal which edge is made to correspond to the first offset value and the reference edge type, and
wherein the first phase changing section offsets, according to the second offset value, the edge of the third PWM signal which edge is made to correspond to the second offset value and the phase change edge type, from the edge of the second PWM signal whose phase is changed by the first phase changing section, and which edge is made to correspond to the first offset value and the reference edge type.

5. The switching power supply according to claim 4,
wherein the control circuit further comprises an offset value receiving section adapted to externally receive the first offset value and the second offset value, the reference edge type and the phase change edge type which correspond to the offset values, and adapted to store the received offset values and edge types in the offset value storing section.

* * * * *